United States Patent
Eom et al.

(10) Patent No.: US 11,741,031 B2
(45) Date of Patent: Aug. 29, 2023

(54) ADAPTIVE I/O COMPLETION METHOD AND RECORDABLE MEDIUM STORING PROGRAM FOR THE SAME

(71) Applicant: Research & Business Foundation SUNGKYUNKWAN UNIVERSITY, Suwon-si (KR)

(72) Inventors: Young Ik Eom, Suwon-si (KR); Jong Gyu Park, Suwon-si (KR); Kwon Je Oh, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 153 days.

(21) Appl. No.: 17/535,894

(22) Filed: Nov. 26, 2021

(65) Prior Publication Data

US 2022/0164302 A1 May 26, 2022

(30) Foreign Application Priority Data

Nov. 26, 2020 (KR) .......................... 10-2020-0161710

(51) Int. Cl.
*G06F 13/22* (2006.01)
*G06F 9/48* (2006.01)

(52) U.S. Cl.
CPC ............ *G06F 13/22* (2013.01); *G06F 9/4881* (2013.01)

(58) Field of Classification Search
CPC .............................. G06F 13/22; G06F 9/4881
See application file for complete search history.

(56) References Cited

U.S. PATENT DOCUMENTS

| | | | | |
|---|---|---|---|---|
| 2015/0052441 A1* | 2/2015 | Degioanni | ............ | H04L 41/145 715/734 |
| 2015/0256481 A1* | 9/2015 | Turovsky | ................ | H04L 47/83 709/226 |
| 2015/0378419 A1* | 12/2015 | Berghe | .................. | G06F 9/5094 713/320 |
| 2020/0388022 A1* | 12/2020 | Bou | .......................... | G06N 3/02 |

* cited by examiner

*Primary Examiner* — Henry Tsai
*Assistant Examiner* — John B Roche
(74) *Attorney, Agent, or Firm* — NSIP Law

(57) ABSTRACT

In accordance with an aspect of the present disclosure, there is provided a method for adaptive I/O completion. The method comprises, determining whether an application is a foreground application or a background application; in response to the application determined to be the foreground application, determining whether the application is a CPU-bound application or an I/O-bound application; and applying an I/O polling method in response to that the application determined to be the foreground application and the I/O-bound application, and applying an interrupt method in response to that the application determined to be the foreground application and the CPU-bound application, or the application determined to be the background application.

12 Claims, 5 Drawing Sheets

ADAPTIVE I/O COMPLETION METHOD AND RECORDABLE MEDIUM STORING PROGRAM FOR THE SAME

CROSS-REFERENCE TO RELATED APPLICATION

This application claims priority to Korean Patent Application No. 10-2020-0161710, filed on Nov. 26, 2020. The entire contents of the application on which the priority is based are incorporated herein by reference.

TECHNICAL FIELD

The present invention relates to an adaptive I/O completion method and a computer program for performing the same. More particularly, the present invention relates to an adaptive I/O completion method for improving user experience in an actual use environment, and a recordable medium storing a computer program for performing the same.

BACKGROUND

The I/O completion method refers to a series of processes in which the central processing unit (CPU) requests an I/O command to the storage device, and after the storage device executes the command, the storage device again notifies the CPU that the command has been completed. However, with the recent development of non-volatile memory technology, the time required to access the storage device has greatly decreased, and the proportion of time consumed due to software overhead in the kernel has increased. In order to reduce this software overhead, methods for optimizing the I/O completion method are being discussed.

As an I/O completion method, according to an interrupt method, the task that the CPU sent an I/O request to the storage device is converted to a sleep state while the storage device processes the corresponding I/O. If the storage device completes the I/O request, the storage device notifies to the CPU, and the task in the sleep state is awakened to resume the operation. However, the interrupt method has a problem in that it accompanies context switch overhead because the application is repeatedly switched between the sleep state and the running state.

On the other hand, according to the polling method, after the task sends an I/O request to the storage device, the CPU continuously checks whether the I/O command has been completed or not. Since the polling method continuously uses the CPU without changing to the sleep state, the task switching overhead can be minimized Thus, better I/O performance and response time is guaranteed in a high-performance storage environment such as SSD. However, the polling method has a problem in that the polling method causes CPU resources because it requests I/O and uses the CPU continuously until it is completed.

In a real-use environment such as a desktop or a mobile, multiple applications with different characteristics are executed simultaneously. Among them, the performance of the foreground application that directly interacts with the user is important in terms of user experience (UX). However, in such an environment, since the polling method continuously checks whether the I/O request has been completed, CPU resource consumption is high, and performance interference between applications due to CPU competition may occur, which may adversely affect the performance of the foreground application.

For example, if the background application is executing an I/O-bound task and the foreground application is executing a CPU-bound task, if the I/O of the background application is progressed in the polling method, the CPU competition is intensified and the performance of the foreground application is degraded.

SUMMARY

In view of the above, the present disclosure provides, a method for adaptive I/O completion and a computer program for performing the same that can minimize the performance interference between applications in a real-use environment in which a plurality of applications are executed, and can increase the user experience (UX) by improving the performance of the foreground application.

In accordance with an aspect of the present disclosure, there is provided the method for adaptive I/O completion. The method comprises, determining whether an application is a foreground application or a background application; in response to the application determined to be the foreground application, determining whether the application is a CPU-bound application or an I/O-bound application; and applying an I/O polling method in response to the application determined to be the foreground application and the I/O-bound application, and applying an interrupt method in response to the application determined to be the foreground application and the CPU-bound application, or the application determined to be the background application.

The method for adaptive I/O completion, wherein the determining of whether the application is the CPU-bound application or the I/O-bound application may comprise determining whether a task of the application consumes all of allocated time slices.

The method for adaptive I/O completion, wherein the determining of whether the task of the application consumes all of allocated time slices may comprise: adding a cpu_bound flag to the task; increasing a count when the task consumes all of the time slices, and decreasing the count otherwise; and determining that the application is the foreground application when the count exceeds a predetermined threshold, and setting the cpu_bound flag.

The method for adaptive I/O completion, wherein the applying of the I/O polling method may be setting a polling flag.

The method for adaptive I/O completion, wherein the setting of the polling flag may be setting a hipri flag, and setting an io_poll flag of a storage device in sysfs.

The method for adaptive I/O completion, wherein the determining of whether the application is the CPU-bound application or the I/O-bound application may comprise setting an io_bound flag to a task of the application upon a case that the application is the I/O-bound application.

In accordance with another aspect of the present disclosure, there is provided A non-transitory computer-readable storage medium including computer executable instructions, wherein the instructions, when executed by a processor, cause the processor to perform a method for adaptive I/O completion comprising: determining whether an application is a foreground application or a background application; in response to the application determined to be the foreground application, determining whether the application is a CPU-bound application or an I/O-bound application; and applying an I/O polling method when in response to the application determined to be the foreground application and the I/O-bound application, and applying an interrupt method in response to the application determined to be the foreground application and the CPU-bound application, or the application determined to be the background application.

The non-transitory computer-readable storage medium, wherein the determining of whether the application is the CPU-bound application or the I/O-bound application may comprise determining whether a task of the application consumes all of allocated time slices.

The non-transitory computer-readable storage medium, wherein the determining of whether the task of the application consumes all of allocated time slices may comprise: adding a cpu_bound flag to the task; increasing a count when the task consumes all of the time slices, and decreasing the count otherwise; and determining that the application is the foreground application when the count exceeds a predetermined threshold, and setting the cpu_bound flag.

The non-transitory computer-readable storage medium, wherein the applying of the I/O polling method may be setting a polling flag.

The non-transitory computer-readable storage medium, wherein the setting of the polling flag may be setting a hipri flag, and setting an io_poll flag of a storage device in sysfs.

The non-transitory computer-readable storage medium, wherein the determining of whether the application is the CPU-bound application or the I/O-bound application may comprise setting an io_bound flag to a task of the application upon a case that the application is the I/O-bound application.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
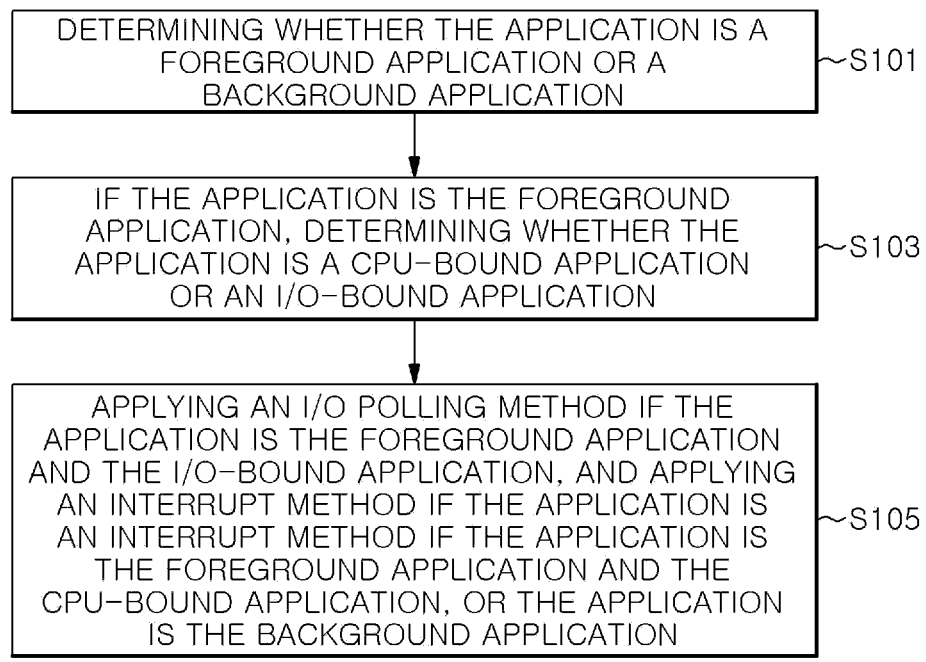
FIG. 1 is a flowchart of an adaptive I/O completion method according to an embodiment of the present disclosure.
Figure 2:
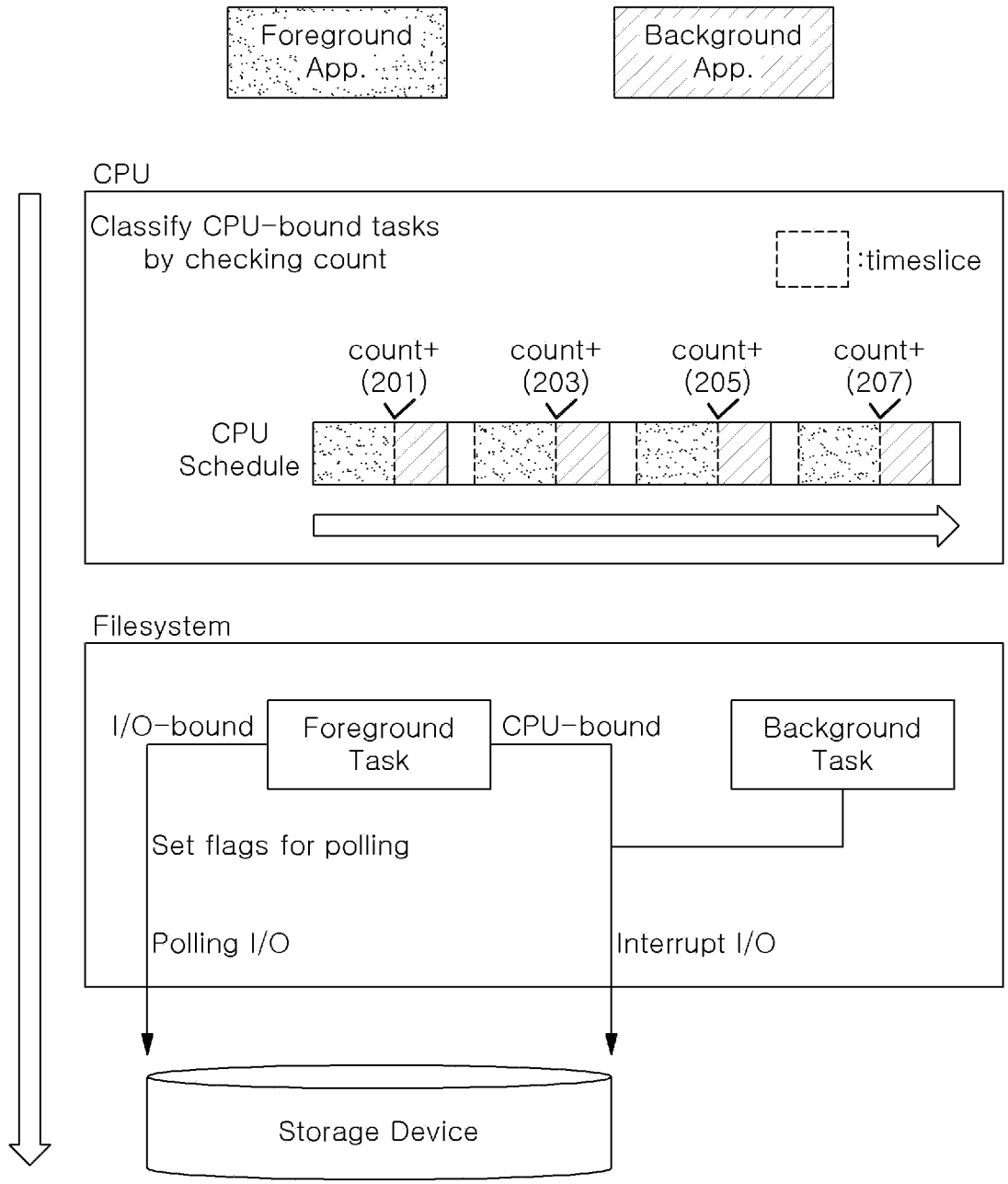
FIG. 2 is a conceptual diagram of the adaptive I/O completion method according to the embodiment of the present disclosure.

FIG. 1 is a flowchart of the adaptive I/O completion method according to the embodiment of the present disclosure, and FIG. 2 is a conceptual diagram of the adaptive I/O completion method according to the embodiment of the present disclosure.

Referring to FIG. 1, in the adaptive I/O completion method according to the embodiment of the present disclosure, it is determined whether an application is a foreground application or a background application in step S101. If the application is a foreground application, the method proceeds to step S103. If the application is a background application, an interrupt method is applied to process I/O.

In step S103, if the application is a foreground application, it is determined whether the application is a CPU-bound application or an I/O-bound application.

In Linux, if an application's task is CPU-bound, it frequently occurs that all of the task's allocated time slices are consumed and are preempted. Using this characteristic, step S103 can be performed by determining whether the task of the foreground application consumes all the allocated time slices.

For example, the cpu_bound flag (flag) is added to the task, the count is increased if the task in the foreground application consumes all of time slices (201, 203, 205 in FIG. 2), and the count is decreased if all of time slices are not consumed (207 in FIG. 2). At this time, if the count exceeds a predetermined threshold, it is determined that the foreground application is a CPU-bound application, and the cpu_bound flag may be set.

In step S105, if the application is a foreground application and an I/O-bound application, the I/O polling method is applied; otherwise, the interrupt method is applied. For example, if the above-described cpu_bound flag is checked in the file system layer and the application is the I/O-bound application, the I/O polling method can be applied. In this case, applying the I/O polling method may be performed by setting a polling flag. For example, after setting the hipri flag used to apply the I/O polling method in Linux and setting the io_poll flag of the storage device in sysfs, an I/O requests are transmitted to the storage device in the I/O polling method.

In step S105, the io_bound flag may be set in order to determine that the task that has performed I/O in the I/O method is the I/O-bound task. Through this, it is possible to prevent an I/O-bound application from being misjudged as a CPU-bound application due to excessive CPU resource consumption caused by I/O polling during the CPU scheduling process.

Figure 3:
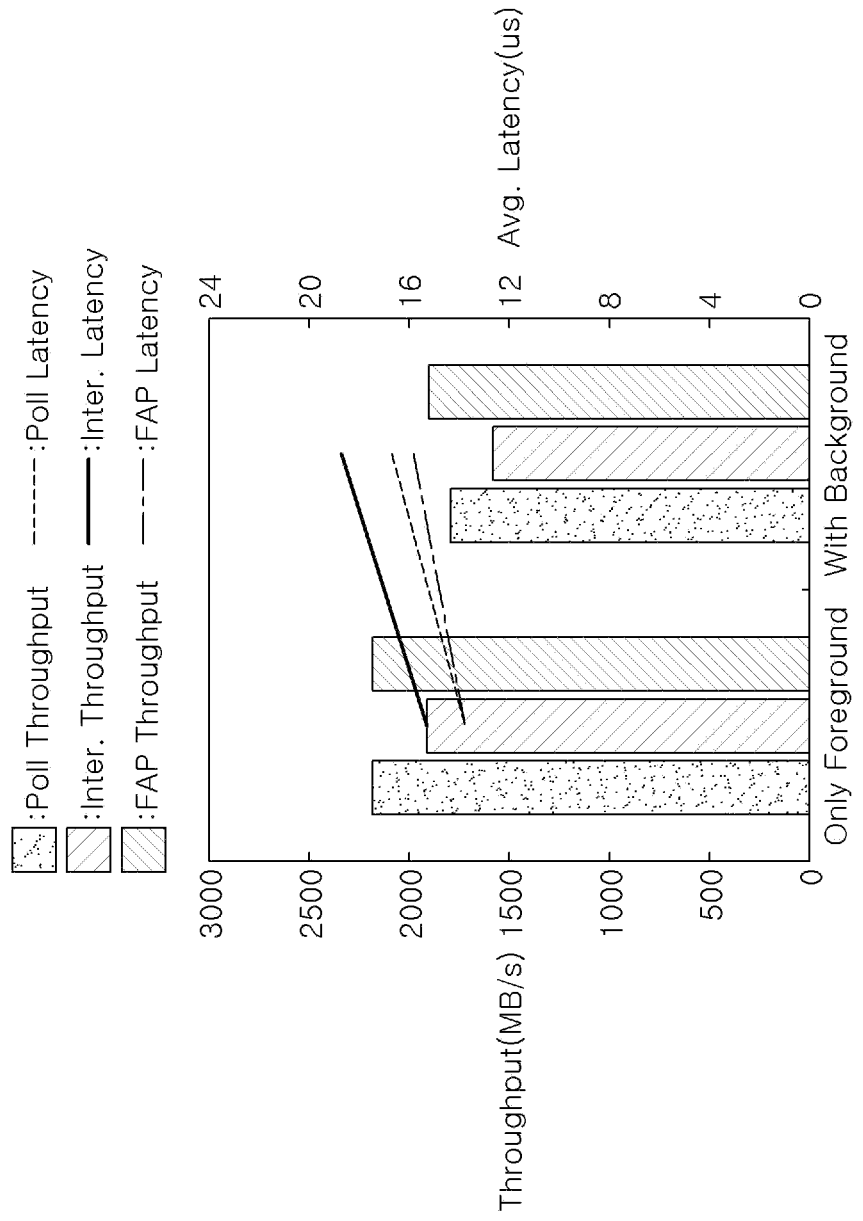
FIG. 3 is a graph showing the performance of the foreground application according to the I/O completion method when the foreground application and the background application process the I/O-bound task.
Figure 4:
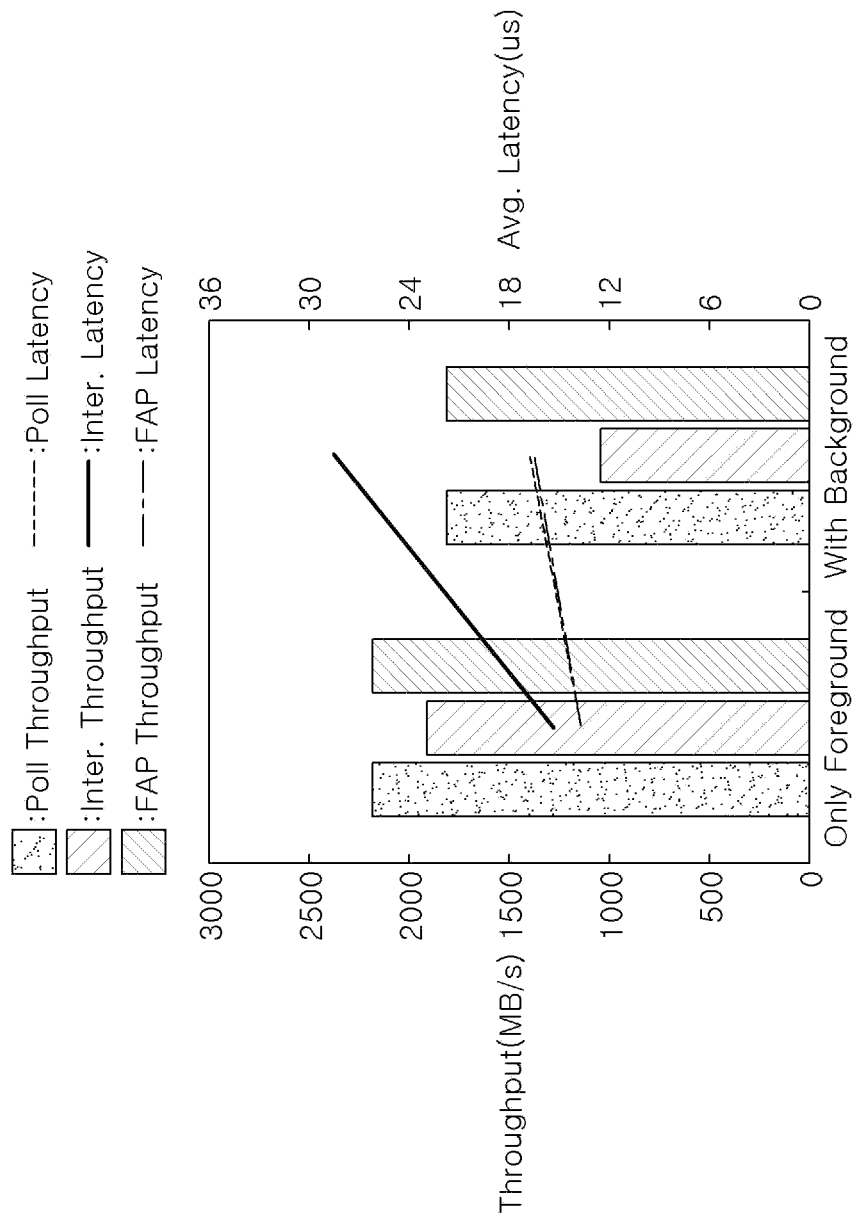
FIG. 4 is a graph showing the performance of the foreground application according to the I/O completion method when the foreground application processes the I/O-bound task and the background application processes the CPU-bound task.
Figure 5:
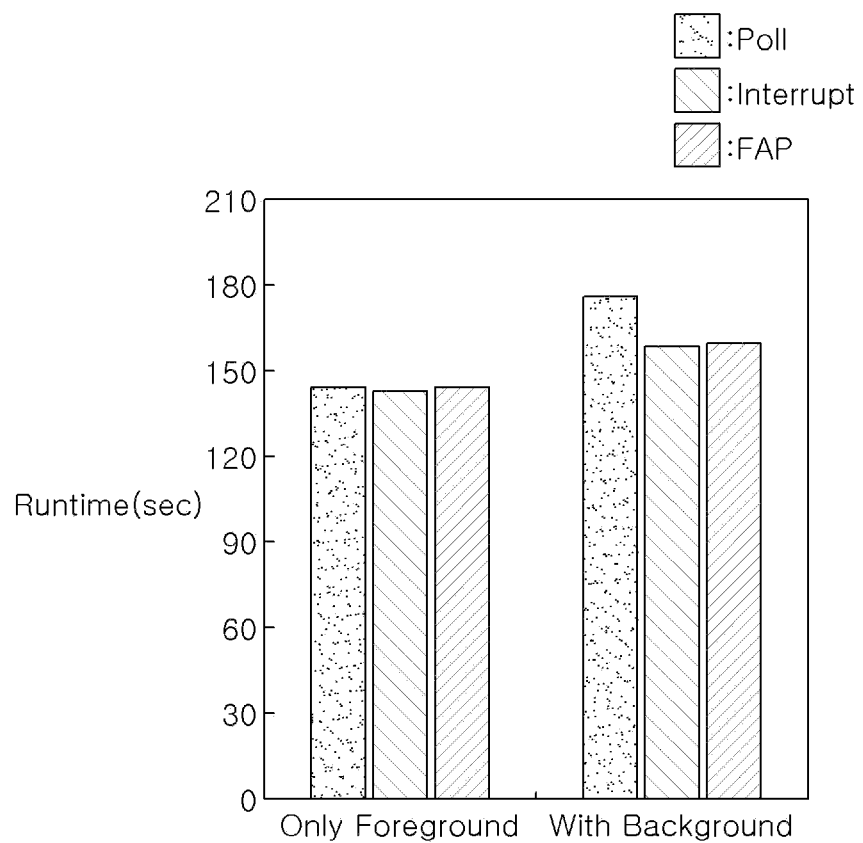
FIG. 5 is a graph showing the performance of the foreground application according to the I/O completion method when the foreground application processes the CPU-bound task and the background application processes the I/O-bound task.

Hereinafter, an experimental result for verifying the performance of the adaptive I/O completion method according to the embodiment of the present disclosure will be described. The experiment compared the performance of the foreground application according to the I/O completion method when the application processes a CPU-bound task and an I/O-bound task. In the experiment, the CPU-bound task was executed by kcbench, and the I/O-bound task was performed by executing a 4 KB random writing task as the FIO benchmark. In FIGS. 3 to 5, the I/O polling method is indicated by 'Poll', the interrupt method by 'Inter.', and the adaptive I/O method according to the embodiment of the present disclosure is indicated by 'FAP'.

FIG. 3 is a graph showing the performance of the foreground application according to the I/O completion method when the foreground application and the background application process the I/O-bound task.

Referring to FIG. 3, when only the foreground application is running, the adaptive I/O completion method according to the embodiment of the present disclosure has the same throughput and average latency as the I/O polling method, and showed about 14% improvement in throughput compared to the interrupt method. On the other hand, when the foreground application and the background application were simultaneously executed, the adaptive I/O completion method according to the embodiment of the present disclosure indicates throughput improved by about 6.3% compared to the I/O polling method and by about 20.7% compared to the interrupt method. These results are because the adaptive I/O completion method according to the embodiment of the present disclosure checks the foreground application that does I/O-bound task and applies the I/O polling method, and applies the interrupt method for the background application.

FIG. 4 is a graph showing the performance of the foreground application according to the I/O completion method when the foreground application processes the I/O-bound task and the background application processes the CPU-bound task.

Referring to FIG. 4, in the interrupt method, the CPU-bound task of the foreground application is pushed out from competition for CPU resource use due to the CPU-bound task of the background application, and the performance of the foreground application is greatly reduced. However, in the I/O polling method and the adaptive I/O completion method according to the embodiment of the present disclosure, since the foreground task continuously uses the CPU and checks whether I/O is completed, about 40% higher throughput is observed than the interrupt method. In terms of average response time, the response time of the I/O polling method and the adaptive I/O completion method according to the embodiment of the present disclosure is about 42% shorter than that of the interrupt method.

FIG. 5 is a graph showing the performance of the foreground application according to the I/O completion method when the foreground application processes the CPU-bound task and the background application processes the I/O-bound task. FIG. 5 is a measurement of the time taken until the kernel compile is completed when the background application executes FIO and the foreground application runs kcbench.

Referring to FIG. 5, when only the foreground application is executed, I/O does not occur, so the three methods show similar performance results. However, when the background application is running, it can be seen that the performance of the foreground application is worse when the I/O polling method is applied than when the interrupt method is applied. In the I/O polling method, the task execution time of the foreground application is increased by about 22.6% due to I/O polling of the background application, but it increased only by about 10.9% in the interrupt method. Even when the adaptive I/O completion method according to the embodiment of the present disclosure is applied, since the foreground application recognizes that the CPU-bound task is being executed and applies the interrupt method in the same way as the background application, the I/O polling method shows about 9.5% faster execution time than the I/O polling method.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A method for adaptive input/output (I/O) completion, the method comprising:
    determining whether an application is a foreground application or a background application;
    in response to the application determined to be the foreground application, determining whether the application is a central processing unit (CPU)-bound application or an I/O-bound application; and
    applying an I/O polling method in response to the application determined to be the foreground application and the I/O-bound application, and applying an interrupt method in response to the application determined to be the foreground application and the CPU-bound application, or the application determined to be the background application.

2. The method of claim 1, wherein the determining of whether the application is the CPU-bound application or the I/O-bound application comprises determining whether a task of the application consumes all of allocated time slices.

3. The method of claim 2, wherein the determining of whether the task of the application consumes all of allocated time slices comprises:
    adding a cpu_bound flag to the task;
    increasing a count when the task consumes all of the time slices, and decreasing the count otherwise; and
    determining that the application is the foreground application when the count exceeds a predetermined threshold, and setting the cpu_bound flag.

4. The method of claim 1, wherein the applying of the I/O polling method is setting a polling flag.

5. The method of claim 4, wherein the setting of the polling flag is setting a hipri flag, and setting an io_poll flag of a storage device in sysfs.

6. The method of claim 1, wherein the determining of whether the application is the CPU-bound application or the I/O-bound application comprises setting an io_bound flag to a task of the application upon a case that the application is the I/O-bound application.

7. A non-transitory computer-readable storage medium including computer executable instructions, wherein the instructions, when executed by a processor, cause the processor to perform a method for adaptive input/output (I/O) completion comprising:
    determining whether an application is a foreground application or a background application; in response to the application determined to be the foreground application, determining whether the application is a central processing unit (CPU)-bound application or an I/O-bound application; and
    applying an I/O polling method in response to the application determined to be the foreground application and the I/O-bound application, and applying an interrupt method in response to the application determined to be the foreground application and the CPU-bound application, or the application determined to be the background application.

8. The non-transitory computer-readable storage medium of claim 7, wherein the determining of whether the application is the CPU-bound application or the I/O-bound application comprises determining whether a task of the application consumes all of allocated time slices.

9. The non-transitory computer-readable storage medium of claim 8, wherein the determining of whether the task of the application consumes all of allocated time slices comprises:
   adding a cpu_bound flag to the task;
   increasing a count when the task consumes all of the time slices, and decreasing the count otherwise; and
   determining that the application is the foreground application when the count exceeds a predetermined threshold, and setting the cpu_bound flag.

10. The non-transitory computer-readable storage medium of claim 7, wherein the applying of the I/O polling method is setting a polling flag.

11. The non-transitory computer-readable storage medium of claim 10, wherein the setting of the polling flag is setting a hipri flag, and setting an io_poll flag of a storage device in sysfs.

12. The non-transitory computer-readable storage medium of claim 7, wherein the determining of whether the application is the CPU-bound application or the I/O-bound application comprises setting an io_bound flag to a task of the application upon a case that the application is the I/O-bound application.

* * * * *